July 22, 1958     E. M. BORG     2,844,067
METHOD FOR ASCERTAINING THE PERCENTAGE
OF BUTTER FAT CONTENT OF MILK
Filed May 25, 1953     2 Sheets-Sheet 2
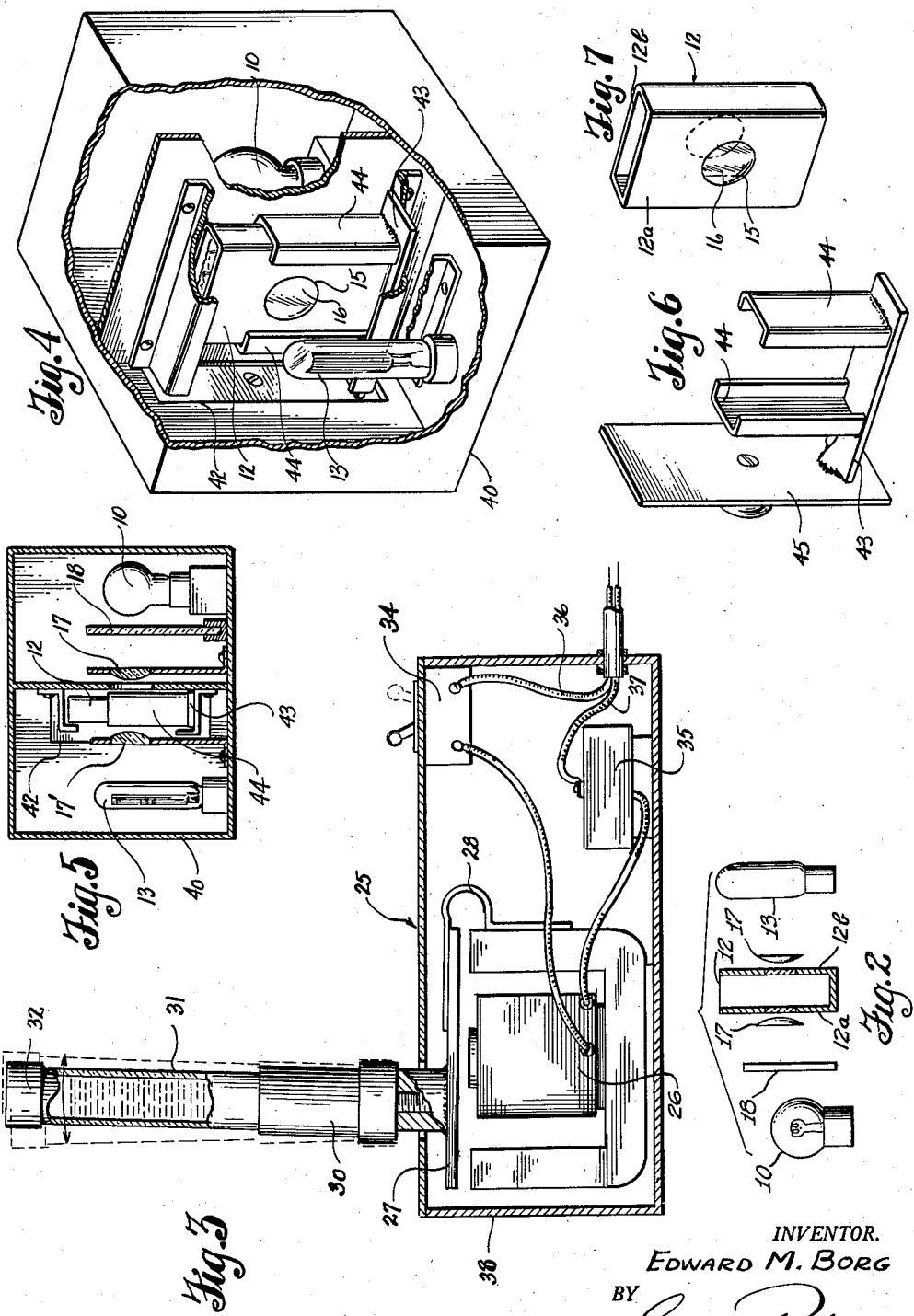
INVENTOR.
EDWARD M. BORG
BY
Cook & Robinson
ATTORNEYS

United States Patent Office

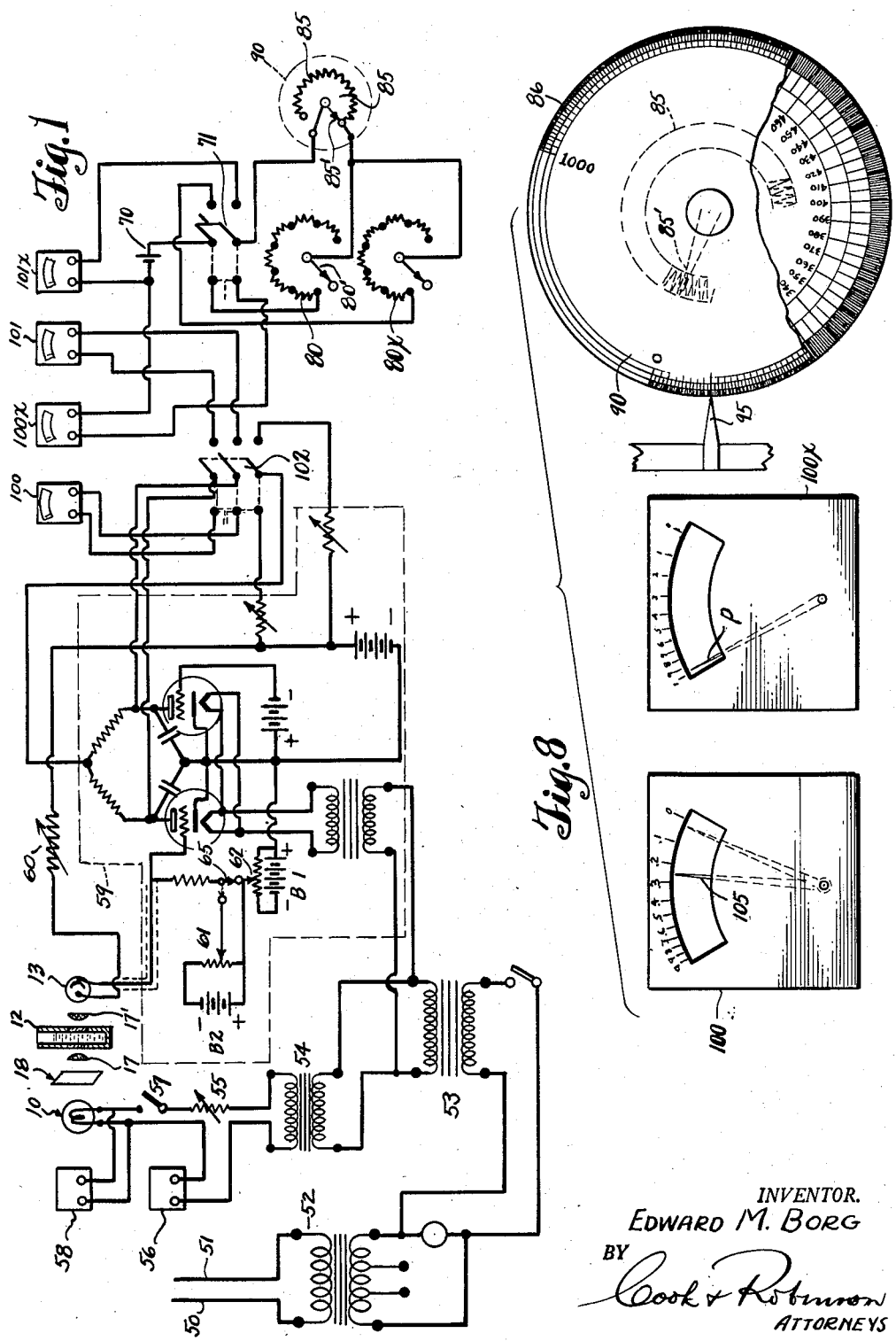

2,844,067
Patented July 22, 1958

2,844,067

METHOD FOR ASCERTAINING THE PERCENTAGE OF BUTTER FAT CONTENT OF MILK

Edward M. Borg, Seattle, Wash.

Application May 25, 1953, Serial No. 357,255

1 Claim. (Cl. 88—14)

This invention relates to the testing of milk for the purpose of determining its butter fat content. More particularly, it has reference to a method of testing milk which includes the passing of a light beam of a predetermined candle power through a prepared sample of the milk to be tested and measuring the stimulating effect of the light that passes through the sample on a photo electric cell. Furthermore, it has reference to provision of a novel apparatus designed to be used for the preparation of milk samples for testing and in electrical apparatus to be used in testing the prepared samples.

It is the primary object of the present invention to provide a method of testing milk samples that may be easily and quickly carried out, and which will show the percentage of butter fat content of the milk from which the samples were taken to a greater degree of accuracy than is possible by present day methods.

It is a further object of the invention to provide a method of preparing milk samples that will avoid all inaccuracies that may be due to lack of uniformity of the liquid constituting the sample.

Another object of the invention resides in the particular arrangement of the light source, the milk sample container and the photoelectric cell and also in the details of construction of the sample container.

More specifically stated, it is the principal object of this invention to provide a method of testing milk which comprises, first, the preparation of a milk sample by its dilution with distilled water, then subjecting the diluted milk to an emulsifying treatment whereby it is given uniform consistency throughout, and finally placing this prepared milk sample in a special container and directing a beam of light of definite strength, or value, through a portion thereof of a definite and established thickness and measuring the amount of light that passes through the milk sample and using the measurement as an indication of its butter fat content.

It is a further object of the present invention to provide an electrically energized instrument or meter, having a graduated scale along which a pointer is caused to move in accordance with the flow of current through the instruments energizing circuit, and wherein the flow of current is in accordance with the degree of stimulation of a photoelectric or light sensitive cell that is placed in position to intercept the light rays that pass through the milk sample from the source of light of definite value.

Further objects of the invention reside in the details of construction of the parts embodied in the testing apparatus, in their functional relationship to each other and in their mode of use, as will hereinafter be fully described.

In accomplishing these and other objects of the present invention, the improved details of construction of the testing apparatus have been provided, as illustrated in the accompanying drawings, wherein:

Fig. 1 is a diagrammatic illustration of the milk testing apparatus of the present invention, showing the electrical wiring for the various instruments employed therein.

Fig. 2 is a view diagrammatically showing the relationship of the container for milk under test with the prepared source of light and the light sensitive cell.

Fig. 3 is a side elevation of the apparatus for emulsifying the milk sample; certain parts being in section for better explanation.

Fig. 4 is a perspective view of the housing with parts broken away and showing the source of light, the milk sample container and the photoelectric cell as mounted therein.

Fig. 5 is a cross-sectional view of the same.

Fig. 6 is a perspective view of the sample holding slide.

Fig. 7 is a perspective view of the sample container.

Fig. 8 is a face view of a meter used for the showing of percentage of butter fat content of a sample and also the instruments used in the taking of a vernier reading of the percentage indicated on the meter.

Referring more in detail to the drawings—

Fig. 1 diagrammatically illustrates the various parts used in the present milk testing apparatus and, as therein shown, the source of light employed in making the test is designated as an electric lamp of a predetermined and specific candle power. This lamp, herein referred to as the "exciter lamp," is designated by reference numeral 10 and in testing apparatus presently being employed, it is an electric lamp of twenty candle power. The milk sample, as prepared for test, is held in a special form of container presently to be described and which is designated in its entirety in Fig. 1 by reference numeral 12. The photo-electric cell, or light sensitive cell which is placed in position to receive and be stimulated by the light that passes through the milk sample as held in container 12, is designated at 13.

The sample holding container 12, as shown in Figs. 2 and 7, is of rectangular form and is open at the top. It may be made of metal or of other suitable material, and it comprises opposite side walls 12a and 12b, that are disposed in parallel vertical planes. Formed in these walls, here shown to be at a position about midway between their upper and lower ends, are openings 15 of about ½ inch diameter, in which panels 16 of clear optical glass are fitted. The inner surfaces of these glass panels are spaced a definite and predetermined distance which, in the presently used equipment, is exactly ⅜ of an inch. The glass panels of this container are in horizontal alignment with and are between the source of light 10 and the photo-electric cell 13, as shown in Fig. 2. Lenses, as shown at 17 and 17', are placed at opposite sides of the container to properly direct the light rays from the lamp through the openings of the container and then to the photo-electric cell.

As an important step in the present process, the milk samples to be tested are prepared in a certain way and then given a certain emulsifying treatment prior to their being placed in the container 12, as will presently be described. Furthermore, and in order that all samples, when under test, may be neutralized with respect to their color, a light filtering material 18 of proper color is disposed between the source of light 10 and the lens 17 and container 12. Special instruments, or devices which are shown diagrammatically in Fig. 1, are used for accurately calibrating the instruments which are used to measure the extent to which the light sensitive or photo-electric cell 13 is stimulated by light that passes thereto through the milk sample; it being understood that the readings of these properly calibrated instruments will vary in accordance with the percentage of butter fat in the individual milk samples placed under test.

Milk samples to be tested are prepared as follows:

A small quantity of fresh raw milk taken from a well mixed batch to be tested is diluted with distilled water. The milk and the water should be within a temperature range of 50° to 70° F. Preferably the proportionate amounts used, and for which the present instruments are calibrated are 2 parts of the distilled water to one part of the milk. The milk and water are thoroughly mixed and then enough of the mixture for a test sample is given what is herein referred to as the "emulsifying treatment"; this being carried out in the manner and by the mechanism which will now be described in connection with the showing thereof in Fig. 3. In this view 25 designates, in its entirety, what may be a magnetic vibrator comprising a magnetic coil 26 and armature 27 mounted at one end for vibratory action by a spring member 28. Fixed to the armature 27 and extended upwardly therefrom is a tubular holder 30 in which a transparent tube 31, for containing the milk sample, is rigidly held in upright position; the tube 31 having a removable closure cap 32 applied thereto. In the present instance the holder tube 30 is of metal and the tube 31 is of clear glass so that the condition of the sample during emulsification can be watched. Circuit connections, from a source of supply of electrical energy, lead to the vibrator coil through a control switch 34 and a dry disk rectifier 35. The circuit wires leading into the vibrator are designated at 36 and 37; these various parts preferably being contained in a housing such as that designated at 38.

In this arrangement of parts, when the vibrator coil is energized, the container 31 is caused to vibrate as indicated by the double ended arrow across its upper end portion.

It is very important to the satisfactory emulsification of the mixture of milk and distilled water that the vibrator be energized by a pulsating direct current as herein provided for to create the necessary vibratory action and to transmit the correct low frequency sound in the mounting tube 30 and thus to tube 31. Emulsification is governed by a very close relationship between pulsations, the material in the tube 31, the tube size and the sound vibrations. The metallic constituents of tube 30, and its length, as also that of the tube 31 has a very definite bearing on the ability of the vibrator to emulsify the sample mixture for the test in a short length of time.

Under the vibrating action of the armature and the sound creating vibrations applied through the metal tube 30, to the tube 31 and transmitted up through the tube 31, the milk sample in the tube will be so agitated that the mixture of two parts distilled water and one part milk will be thoroughly emulsified and the entire body of liquid thus rendered of uniform consistency throughout. This emulsification of the sample is limited in duration to avoid butter formation in the sample, and it is an important treatment in that it prevents any inaccuracy that might be caused later in making a test by reason of the light beam being cast through a part of the sample that was not uniform, for example, the light beam being directed through an oily portion. Proper emulsification of diluted raw milk can be attained in from two to five seconds and proper dilution can be noted by sight. The container 12 is then filled with the emulsified mixture and the container placed in position for the test between the lamp 10 and cell 13, as has been shown in Fig. 2.

It will further be explained that the various parts 10, 18, 12 and 13 are assembled in a housing as has been shown in Figs. 4 and 5 wherein 40 designates a light proof housing which encloses therein the lamp 10, the light filter plate 18, lenses 17—17' and photo-electric cell 13. In one side of the housing is an opening 42 through which a slide 43 is horizontally movable. On the slide, upright brackets 44—44 are fixed in spaced relation for the reception and proper holding therebetween of the container 12. The slide is movable into and from the housing through the opening 42, and when in place, it disposes the container 12 properly between light source 10 and the cell 13. A shield 45 is attached to the slide to move therewith to cover the opening 42 when the container is in testing position.

The electrical system used in connection with the parts 10 and 13 provides for adjusting the lamp to a designated candle power, for calibrating the meters and for designating thereon the extent of stimulation of the photo-electric cell when a milk sample is tested. In this system, as shown in Fig. 1, I employ a meter designated at 100 for use in testing milk samples, and another meter designated at 101 for use in testing cream samples, each being carefully calibrated for these purposes.

Referring now more particularly to Fig. 1:

Voltage is supplied to the equipment through wires 50 and 51 and a line voltage regulated transformer 52 to an automatic voltage regulated transformer 53 then to a step-down transformer 54 that supplies voltage and current to the exciter lamp 10. Interposed in the lamp circuit is a variable resistance 55, an alternating current ampmeter 56 and a switch 57. Across the lamp supply circuit is an alternating current voltmeter 58.

By the above means, interposed and parallel in the circuit, the candle power of lamp 10 desired can be accurately established. The disposition of the lamp is such that light energy passes therefrom through the color filter 18, which preferably is blue, then to lens 17 whereby it is concentrated in a beam that is directed through the milk sample container 12, passing through the side wall opening thereof. The beam after passing through the milk sample is focused by lens 17' on the photo-electric cell 13. The stimulating effect of this light on the cell 13, which is in accordance with the amount of light energy reaching it, governs the amount of voltage that is supplied thereby to the grid of the vacuum tube bridge-type amplifier which is used and which in the diagram of Fig. 1 is enclosed in the dash line enclosure 59.

The extent to which the cell 13 is stimulated is indicated on the scale of meter 100 if milk samples are being tested. If cream samples are being tested, the meter 101 is employed and meter 100 is cut out of the system.

The selection of meter to be used is through the hand setting of a double throw switch designated at 102. In the dotted line position, it closes the circuit for meter 100. In the opposite position it closes the circuit for meter 101.

It is to be understood that the meters are calibrated by use of predetermined standards. The variable resistor 60 in the cell circuit is adjusted to a predetermined value to supply voltage that will override the variable resistors 61 and 62. The voltage to the plate circuit of the bridge amplifier is so adjusted that in taking a reading on meter 100 of a skim milk sample the pointer 105 of the meter will swing approximately across the scale as indicated by the dotted line position of the pointer in Fig. 8.

Batteries B1 and B2 are bias batteries that adjust the grid voltage on the bridge amplifier so that the lamp energy coming to the photo electric cell through the milk sample can be measured.

In the primary setting, switch 65 is in full line position of Fig. 1 and variable resistance 62 is so adjusted that meter 101 gives a .5 reading. Then the switch is put in dotted line position and variable resistance 61 is adjusted to give a meter reading of .1.

In the present instance provision has been made for obtaining a vernier reading of the scale reading of meter 100. To do this, a meter 100x like meter 100 is provided; this being adapted to be connected in an independent circuit with a battery 70 and variable resistors 80 and 85 as shown at the left hand side in Fig. 1.

Likewise there is provided for use in connection with meter 101, a meter 101x which is adapted to be cut into the circuit with battery 70 and including also the variable resistor 85 and a variable resistor 80x.

The battery circuits for meters 100x and 101x are selectively brought into use by the proper positioning of the switch 71. In the dotted line position it closes the circuit for meter 100x and in its opposite position, it closes the circuit for meter 101x.

Assuming then that a milk sample has been prepared and placed in the container 12, and the container placed in testing position, the test is made as follows: Switch 57 is closed to energize the lamp 10. Light passing through the milk sample stimulates the cell 13 and a reading is shown on meter 100. The position of the pointer relative to the meter scale indicates the percentage of butter fat content of the milk sample, and it will be understood that the more butter fat in the sample the lesser will be the stimulating effect on the lamp and the extent of movement of the pointer will be in accordance with the stimulating effect.

If the pointer should come to rest between the scale markings on meter 100, then a vernier reading can be taken. This is carried on as follows:

Assuming that the pointer stops between the scale markings 2 and 3, as in full lines in Fig. 8. The operator then closes switch 71 thus to connect meter 100x in series circuit with battery 70 and the variable resistances 80 and 85. The movable contact 80' of resistance 80 is then adjusted to a position that will cause the pointer $p$ of the meter 100x into exact parallelism with the pointer of meter 100; it being understood that these two meters are exactly alike. Then the movable contact 85' of resistance 85 is adjusted until the pointer $p$ of meter 100x has been caused to move into coincidence with the adjacent graduation of smaller designation, that is, into coincidence with the two graduations on the scale.

It will here be explained that the resistance element 85 is equipped with a graduated scale 86 on a disk 90. This disk is mounted coaxially of the resistance element and rotates with the movable contact element 85'. Adjacent the periphery of the disk is a fixed pointer 95 as seen in Fig. 8. The scale 86 extends through an arc of 270° which corresponds to the extent of the resistance element, and it is divided into 1000 parts; a portion of the scale being shown enlarged in Fig. 8. The adjustment of the contact 85' through its complete arc will cause the pointer $p$ of meter 100x to retract one point, for example from 3 to 2 or from 2 to 1.

Therefore, in that adjustment of resistance effected by movement of the contact 85' that brings the pointer $p$ of meter 100x from parallelism with the pointer of meter 100 back to coincidence with the 2 mark on its scale, the dial 90 will be rotatably adjusted and a reading thereon is taken at the position of pointer 95. For example, if the reading on scale 86 is .325, then the percentage of butter fat content of milk from which the sample was taken would be 2.325%.

If a cream sample is being tested the switch 71 is thrown to a position to connect the meter 101x in series with the battery 70, resistance 80x and resistance 85. The test is made exactly in the same way as previously described for testing a milk sample.

In the following claim, the term "milk" will be understood to include cream or combinations of cream and milk or other substances that could be tested and the testing not inconsistent with the invention as herein disclosed.

Having thus described my invention, what I claim as new therein, and desire to secure by Letters Patent, is:

The method of determining the butter fat percentage of a batch of milk or the like, comprising diluting a sample of said milk constituting one part with two parts of distilled water, emulsifying the mixture, directing light from an exciter lamp of a predetermined candle power through a color filter and a quantity of said emulsified mixture of predetermined thickness to a photoelectric cell, and measuring the extent of its stimulation by use of a meter having its indicating scale calibrated to show current intensity as butter fat percentages.

References Cited in the file of this patent

UNITED STATES PATENTS

| | | |
|---|---|---|
| 294,052 | Leeds | Feb. 26, 1884 |
| 369,841 | De Laval | Sept. 13, 1887 |
| 1,329,183 | Hoyberg | Jan. 27, 1920 |
| 1,863,222 | Hoermann | June 14, 1932 |
| 2,051,320 | States | Aug. 18, 1936 |
| 2,073,223 | Rose | Mar. 9, 1937 |
| 2,129,516 | Wood | Sept. 6, 1938 |
| 2,255,034 | Bauer | Sept. 2, 1941 |
| 2,458,313 | Stevens | Jan. 4, 1949 |
| 2,505,423 | Morgan | Apr. 25, 1950 |
| 2,752,815 | Batchelor | July 3, 1956 |